Sept. 13, 1966     P. AMERIO ETAL     3,271,973

AUTOMATIC CONTACT PLATE FREEZERS

Filed Sept. 18, 1964     6 Sheets-Sheet 1

INVENTORS.
PASQUALE AMERIO
REYNOLD E. MINNICH
BY
JOHN P. CHANDLER

THEIR ATTORNEY.

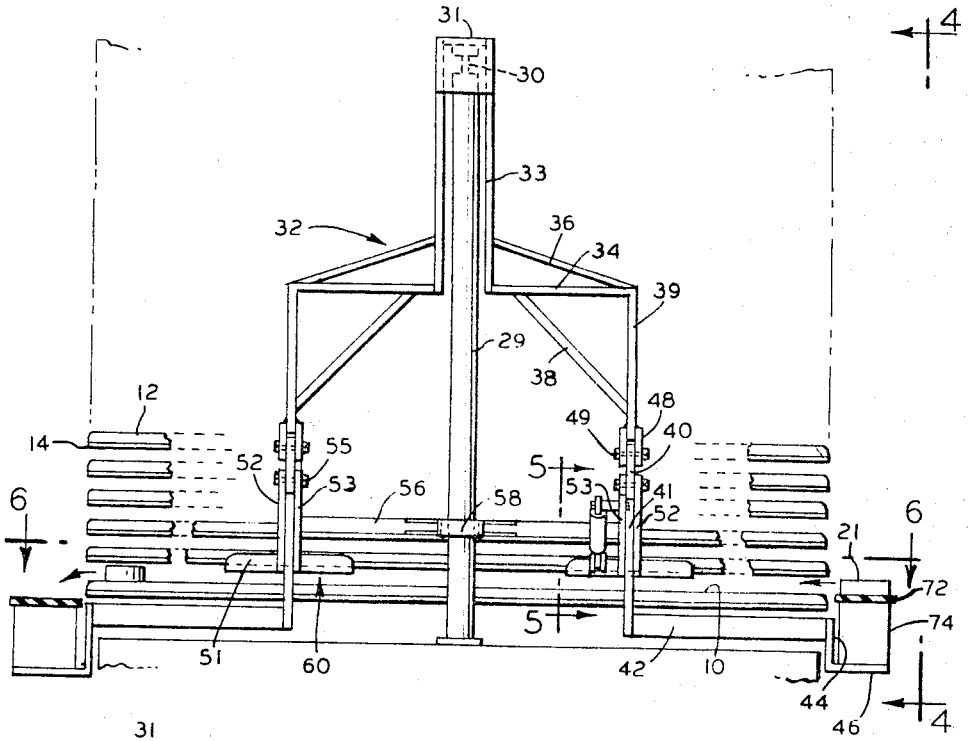
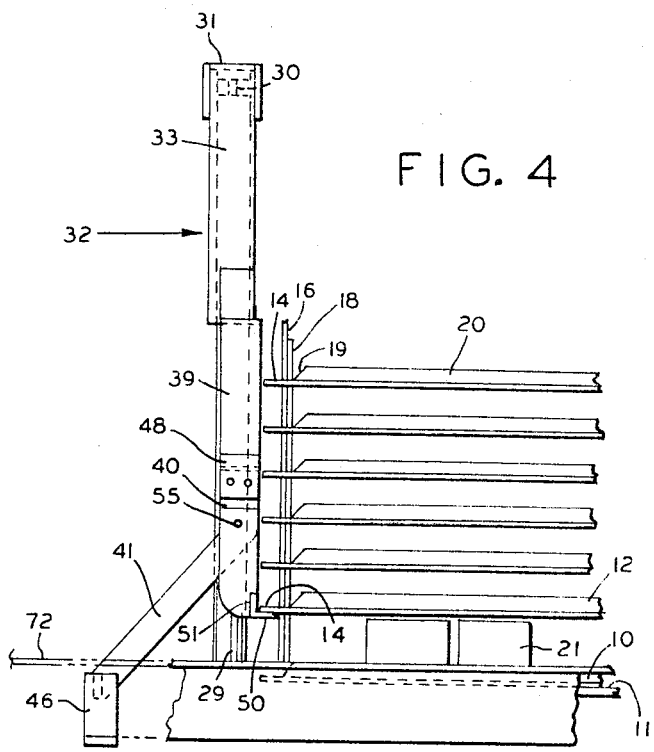

Sept. 13, 1966  P. AMERIO ETAL  3,271,973
AUTOMATIC CONTACT PLATE FREEZERS
Filed Sept. 18, 1964  6 Sheets-Sheet 3

INVENTORS.
PASQUALE AMERIO
REYNOLD E. MINNICH
BY JOHN P. CHANDLER
THEIR ATTORNEY.

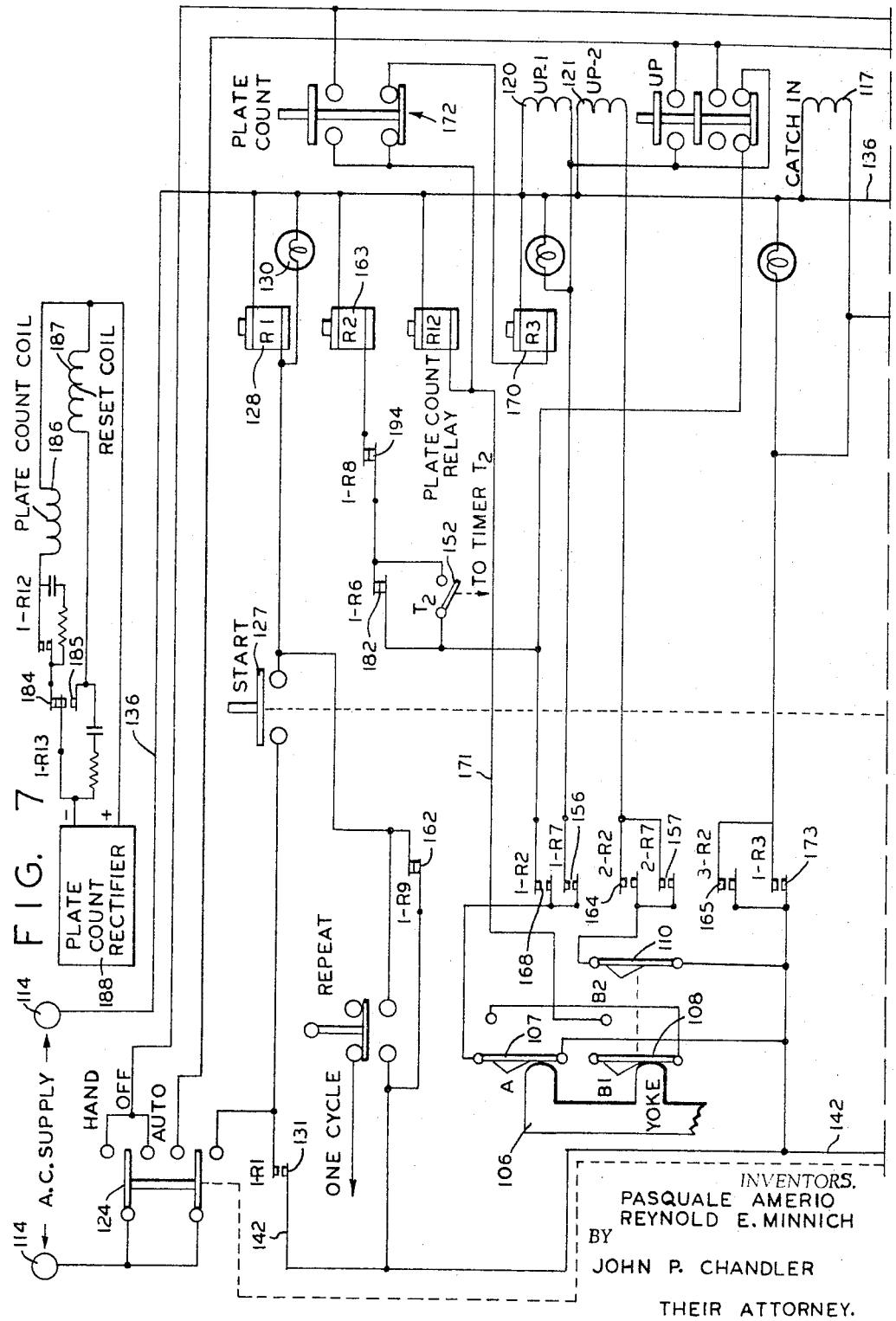

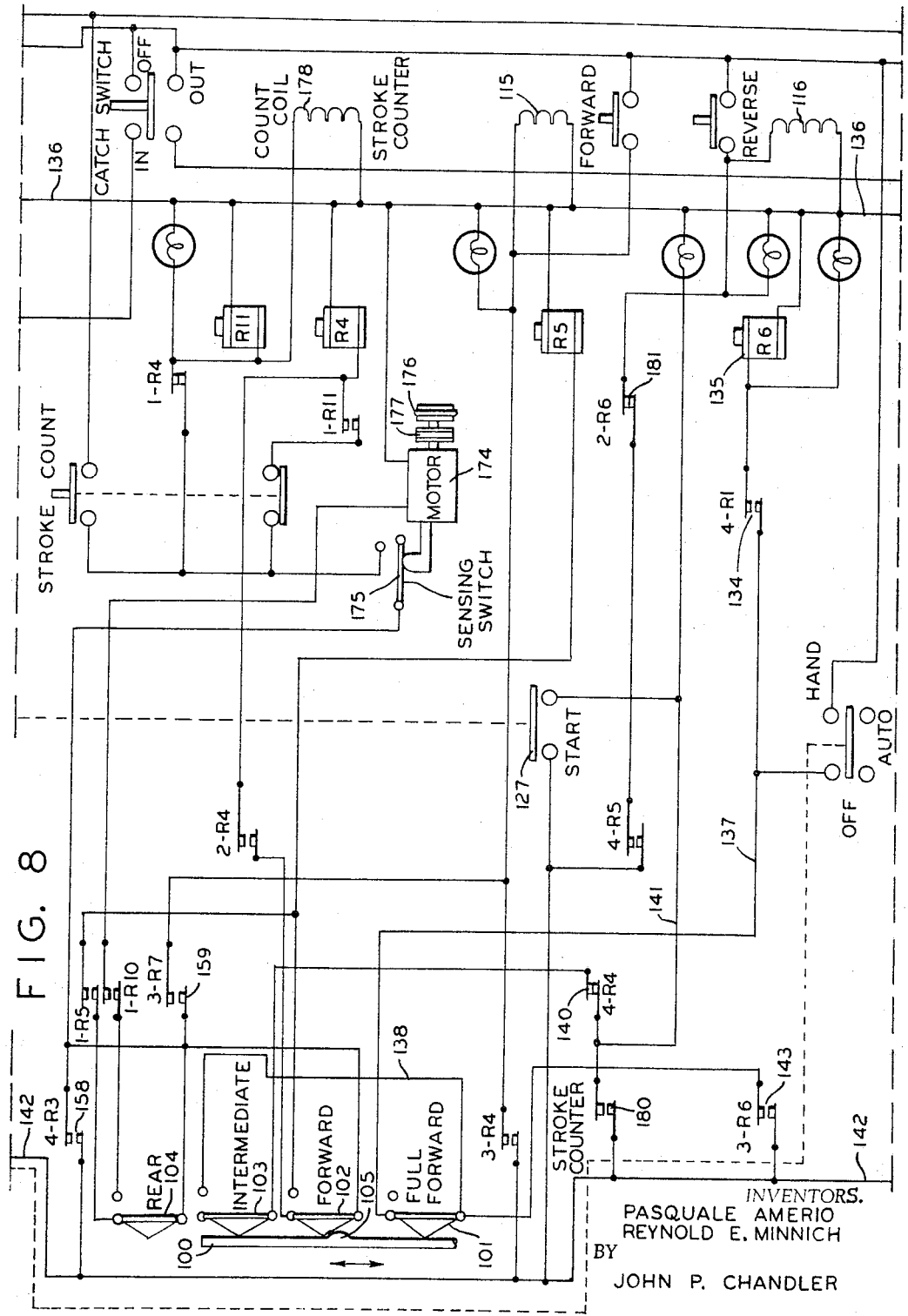

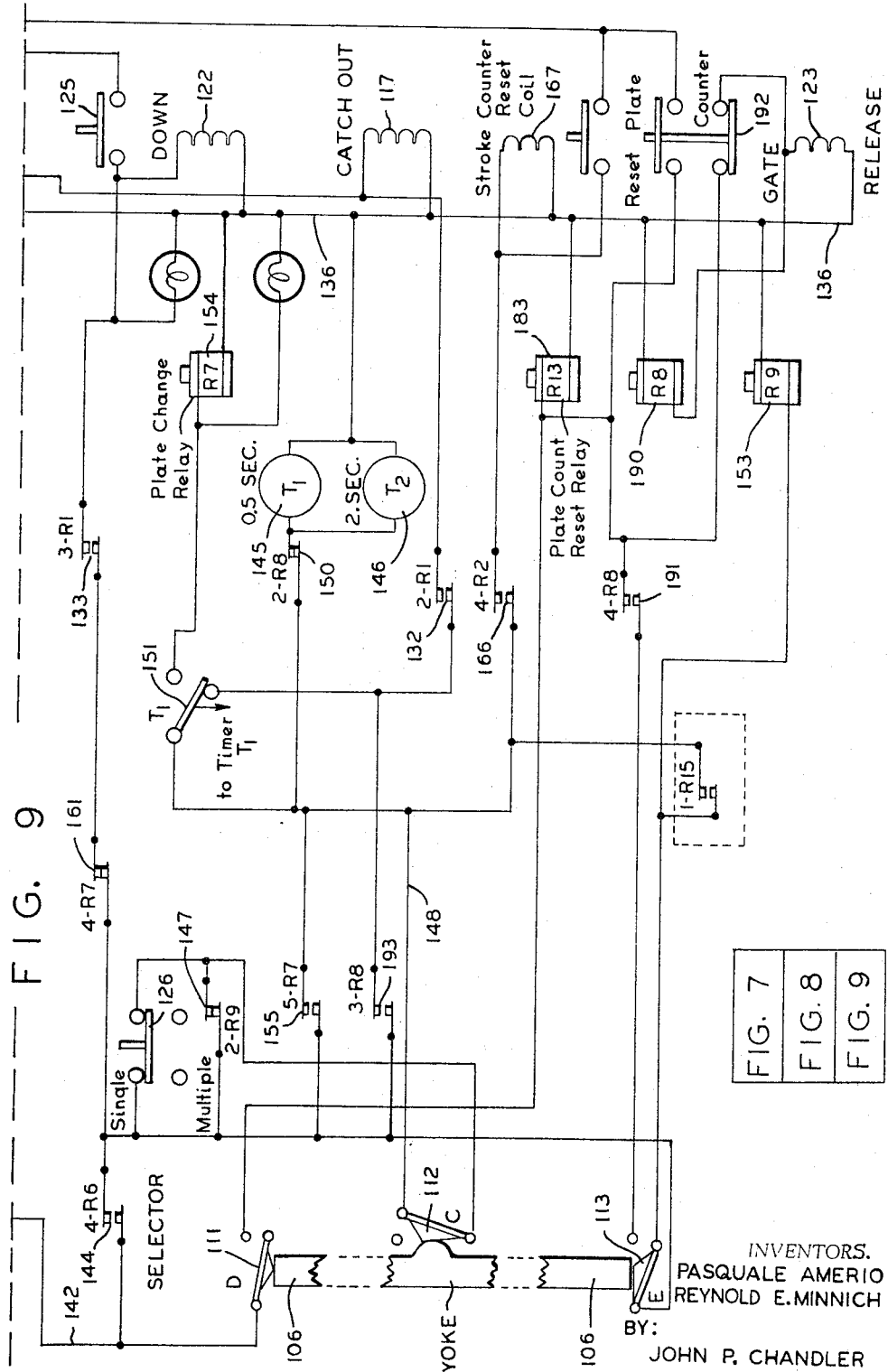

United States Patent Office 3,271,973
Patented Sept. 13, 1966

3,271,973
AUTOMATIC CONTACT PLATE FREEZERS
Pasquale Amerio, Erskine Lakes, and Reynold E. Minnich, Martinsville, N.J., assignors to Amerio Refrigerating Equipment Co., Inc., Union City, N.J., a corporation of New Jersey
Filed Sept. 18, 1964, Ser. No. 397,990
5 Claims. (Cl. 62—341)

This invention relates to automatic contact plate freezers and relates more particularly to a plate freezer with improved means for rapidly loading the cavities between the plates.

Contact plate freezing for packaged foods is preferred over tunnel freezing because the plates which are in firm contact with the upper and lower walls of the boxes prevent them from expanding all out of shape as the freezing continues. Also the freezing is more rapid than is the case with a tunnel freezer although tunnel freezing is preferred for unpackaged foods.

During the operation of loading each cavity in a contact plate freezer an additional spacing must be effected between the plates in order to permit the boxes to be fed in without obstruction. Means for accomplishing this as shown in Mackenzie Patent No. 2,697,920 and in Amerio and Kraft Patent No. 2,882,697 wherein the plates are mounted in a cradle or elevator which moves up and down within a tall insulated housing having charging and discharge openings in two opposed walls. All loading is thus done at a single level and the increased spacing is effected by catch arms which move in under the upper plate of any pair forming a cavity, after which the cradle is dropped an inch or less while the upper plate is thus supported against downward movement. The first mentioned patent shows an apparatus employing manual control while a fully automatic freezer operation is disclosed in the second patent.

The primary objection to the cradle type of operation resides in the fact that because of the considerable height of the structure an enormous amount of head room is required and a special building having unusually high ceilings must be constructed for its installation. If a conventional building is used it is almost always necesary to break a hole in the ceiling to accommodate this large head room and usually also a hole in the walls must be made in order to get the freezer into the building. Also, the shipping charges and transportation difficulties are unusually high.

An important object of the present invention is to provide an improved contact plate freezer with a novel feeding arrangement wherein the height of the insulated housing is about one-half that of the foregoing cradle type freezer having the same number of plates. The much smaller outer surface area of the housing greatly reduces the cost of the freezer and also the cost of operation.

Another object of the invention is to provide a novel conveyor arrangement for feeding the unfrozen boxes at a plurality of levels, the conveyor being raised and lowered by an assembly which includes the plate separating means which successively produces the increased plate separation at each cavity during loading. Alternatively, the vertically movable conveyor may be wholly independent of the plate separating means but will move in synchronism therewith. In either arrangement, the important thing is the ability to feed the boxes into each cavity at its own level rather than to move the cradle and all of the plates up and down to successively position each cavity between each pair of plates at a single feeding level. The result of the plural level feed is a much more economical operation than where all the plates are simultaneously spaced their maximum distance at one time as shown in Patent No. 2,882,697, since as each cavity is being loaded at its particular level the freezing may continue in the other plate cavities. By this arrangement a bank 3 or 4 freezers may be continuously fed and when the last freezer is filled the boxes of food in the first freezer are frozen, ready for discharge.

Another object of the invention is to provide a high speed contact plate freezer of the character described wherein the over-all cost of installation and operation is reduced over that of the cradle type of freezer and the simplicity of its construction greatly reduces the chance of breakdowns.

Another important advantage of the improved freezer over the cradle type of operation is in the fact that the flexible conduits for the fluid refrigerant are much shorter. The lowermost plate of the stack always remains on the floor of the housing and the uppermost plate need not move more than a few inches unless boxes of much greater thickness are to be frozen occasionally. This permits the use of stainless steel flexible tubes rather than rubber hoses and allows for use of higher pressure in the refrigerant systems and hence, faster freezing.

The automatic freezer of the present invention may use a pusher assembly like that shown in Patent No. 2,812,050 and a method of grouping a full row of boxes prior to pushing as shown in Patent No. 2,842,253 reference is made to both of these patents in the description of the control circuit.

In the drawings:

FIG. 3 is a side elevation thereof.

FIG. 4 is a broken view taken at right angles to FIG. 3, the view being taken on line 4—4 of FIG. 3.

FIGS. 7, 8 and 9, when combined as shown in the block diagram below FIG. 9, shows the control circuit.

Figure 1:
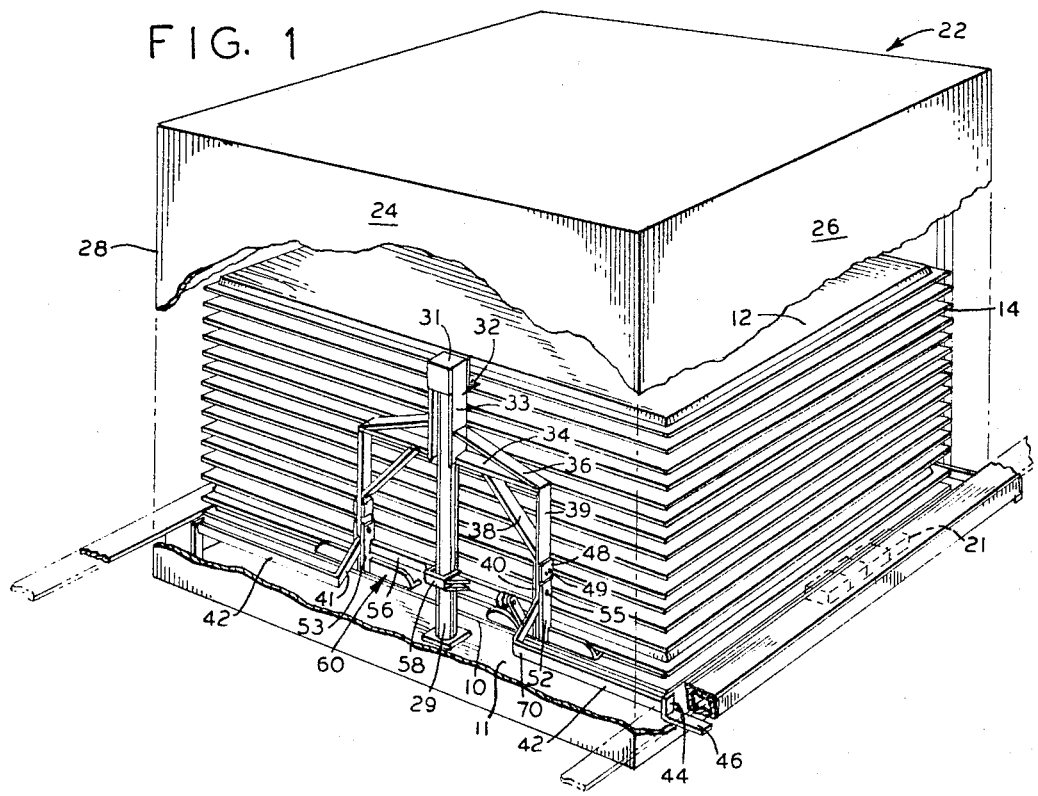
FIG. 1 is a perspective view of an automatic contact plate freezer embodying the present invention, portions of the insulated housing being broken away to show the internal mechanism.

The assembled freezer unit shown in FIG. 1 includes a plurality of superimposed freezer plates, the lowermost one, 10, of which, is supported in fixed relation on a frame which may comprise the base wall 11 of the closed housing unit having horizontal and vertical walls. The plates 12 above plate 10 having limited vertical movement as hereinafter described.

These plates are of conventional construction and have a shallow internal area (not shown) containing square or round pipes through which the fluid refrigerant passes. They may also be formed from extruded aluminum sections. They further have flanges 14 around the edges thereof by which the plates are supported during lifting movement by the catch arms hereinafter described. These plates are retained in vertical alignment during their brief vertical travel by any suitable guide means such as fixed vertical rods 16 which pass through holes (not shown) near the corners of the plate.

In order to prevent the plates above said lower plate from crushing the boxes or packages of unfrozen foods which are fed into the cavities between the plates, conventional means are provided for securing minimum spacing between the plates. These means may comprise spacer bars 18 placed on the plates between the guide-rods 16 and the diagonal end wall sections 19 of the upper walls 20 of the plates as shown in FIG. 4. These spaced bars are of a height only slightly less than the height of the boxes 21. For instance if the boxes are 2" in height the spacer bars may be 1$\tfrac{5}{16}$" which assures good freezing contact with the upper and lower box walls.

These bars are not generally secured in place in order that they can readily be changed for boxes of different thicknesses. For instance, half gallon ice cream boxes are about 4″ thick.

The plates are enclosed within an insulated housing 22 having doors (not shown) on two opposed sides 24 in order to gain access to the plates and plate supporting mechanism. The front and rear walls 26 and 28 also are provided with suitable openings for the loading and unloading operations hereinafter described.

The plate separating mechanism on each side of the plates includes a hydraulic cylinder 29 whose lower end is supported on base wall 11. A piston rod 30 (FIG. 3) extends upwardly from the cylinder and it engages an inverted U-shaped top plate 31 of a frame or yoke structure 32 including spaced side bars 33, cross bars 34, diagonal reinforcing struts 36 and 38 and a pair of widely spaced vertical arms, each formed in an upper section 39 and a connected lower section 40. This latter section has a lower portion 41 which is offset diagonally outwardly and this latter portion in turn has a lateral section 42 extending one towards the front and one towards the rear of the freezer. An angle bracket 44 having a horizontal section 46 is welded or otherwise secured at the end of each lateral section 42. Each arm section 40 of this yoke with its extensions 41 and 42 could be formed integrally with each upper arm section 39 since it is rigidly carried thereby but arm 40 is shown as being separately formed to enable the lower section of the yoke to be disassembled when the occasion arises.

Arm 40 is rigidly mounted on arm 39 between two plates 48 which are welded to the latter. It is then bolted between the plates by two bolts 49. The catch arm, of which there are four, is an angle member with a horizontal portion 50 which underlies the freezer plate flange 14 and a vertical section 51 which is secured as by welding to two pairs of spaced bars 52 and 53 which are pivotally mounted on opposite sides of lower arm section 40 by means of a pivot member 55. The inner bar 53 of each pair of spaced bars is connected to the other bars 53 by means of a channel shaped yoke bar 56 having a central outwardly offset U-shaped section 58.

Figure 5:
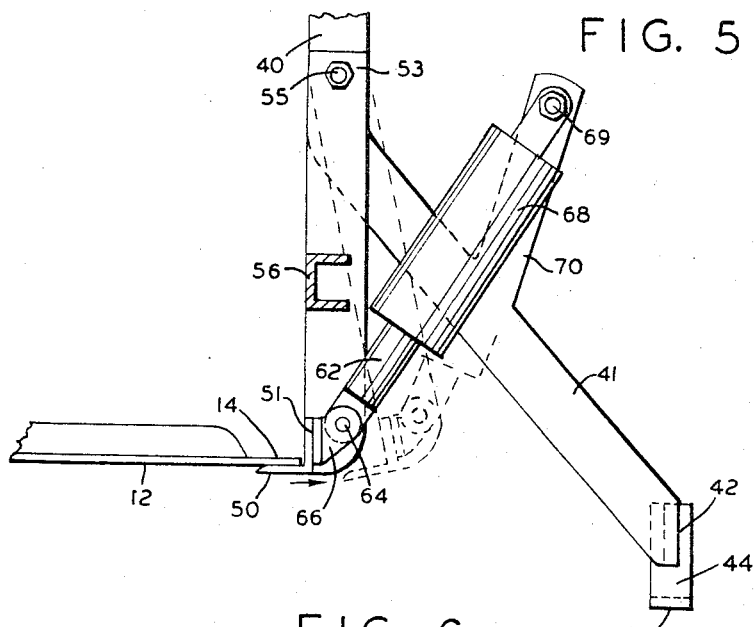
FIG. 5 is a broken section taken on line 5—5 of FIG. 3.

This pivoted assembly 60 including angles 50–51 forming the plate lifting catch arms, bars 52–53 and yokes 56–58, is thus movable from an inward, plate-supporting position, shown in full lines in FIG. 5, to an outward position shown in broken lines in the same figure and when in the former position the central yoke section 58 receives the fixed hydraulic cylinder 29 is received. Any convenient means may be employed for moving the pivoted catch arms inwardly such as a hydraulic system including a piston 62 pivotally connected at its lower end at 64 to a bracket 66 welded to catch arm.

The piston passes into a hydraulic cylinder 68 pivoted at 69 to an arm 70 welded to diagonal arm 41. The piston (not shown) within the cylinder may be driven by fluid pressure in both directions or it may drive the pivoted catch arm assembly inwardly and be returned by means of a spring.

The purpose of the two brackets 44–46 at the front and at the rear of the freezer unit is to support the conveyor for loading and discharging the boxes 21. In the event that the conveyors are separate from the plate lifting mechanism the members 41, 42, 44 and 46 are omitted. In the arrangement shown, however, each conveyor includes an endless belt 72 which moves over a plate 74 and conventional conveyor extensions (not shown) are positioned at opposite ends of each conveyor belt 72 for feeding the boxes 21 to belt 72 on the feed side and for receiving them on the discharge side.

The control circuit includes the usual Start-Stop switching means and three mechanical means which are arranged to close and open electrical contacts in order to move a pusher bar (not shown) to raise and lower the yoke, and to open and release the freezer plates during a loading-discharging sequence.

The automatic pusher assembly which pushes boxes of unfrozen food onto a freezing plate at the same time the frozen boxes are delivered at the other side of the plate has been described and claimed in Patent 2,812,050, earlier mentioned. In this assembly the pusher bar is powered by a hydraulic means including a piston in a cylinder, shown in detail in FIGS. 2, 6, and 7 of that patent. As the pusher bar is moved through its sequence of positions, a contact rod 100 (FIG. 11) moves past four control switches 101, 102, 103 and 104. These are called "Full Forward," "Forward," "Intermediate," and "Rear." They control a number of relays and other circuits which will be described later. These switches are operated by a knob 105 on the rod.

A yoke 106 (the entire yoke structure is designated 32 in FIGS. 1–6) is employed to move two conveyors alongside the freezer plates up and down to convey the unfrozen food packages from the other side of the plates. The yoke not only moves the conveyors up and down, it also separates the freezer plates an additional distance so that there is sufficient room to move the packages. The yoke 106 controls five switches, three, 107, 108, and 110 which are operated when the yoke has risen far enough to open a set of plates so that the pusher bar sequence can begin. The yoke also operates three other switches 111, 112, and 113. The first of these 111 is secured to the top of the freezer frame and is operated only when the yoke 106 rises after the last plate has been filled with packages. The second 112 is operated when the yoke moves down after two plates have been opened for loading. The third 113 is operated by the yoke when it has been moved all the way down to its lowest position. The above described mechanically operated switches control the electrical circuit.

Figure 2:
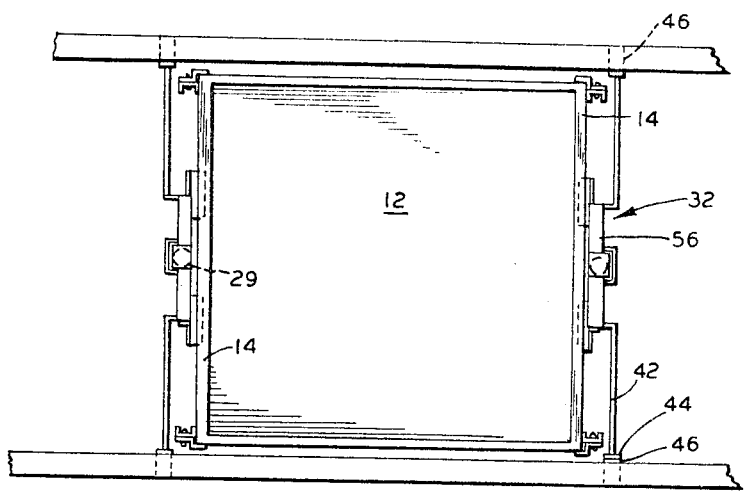
FIG. 2 is a plan view of the plate assembly.
Figure 6:
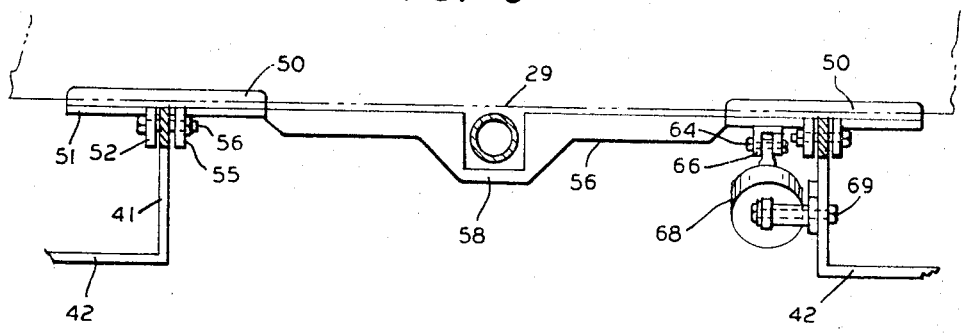
FIG. 6 is a broken section taken on line 6—6 of FIG. 3.

The electrical control circuit is shown in FIGS. 7, 8, and 9 which are to be combined as indicated in FIG. 10 to produce the entire circuit. The control circuit is supplied with alternating current power which is to be applied to terminals 114. Ten solenoids are activated by the control circuit to control the mechanical operations. In addition, two counting devices are activated, one for counting the number of times the plunger pushes a row of packages onto a freezer plate. The other counter is set to count the number of freezer plates. Two of the solenoids "Forward" 115 and "Reverse" 116 control hydraulic valves connected to a cylinder and piston for moving the automatic package pusher. This device is shown in FIGS. 2, 6 and 7 of Patent No. 2,812,050 and its operation is fully described in that specification.

As the conveyor moves up and down, to load the food boxes, the freezer plates are separated to permit easy loading and, while separated, they are held by catches supported by the yoke 32. The catches are moved into and out of engagement by two other solenoids 117 and 118. Finally, the yoke and the conveyor are moved up and down by a hydraulic piston (see FIG. 1) and this motion is controlled by two "UP" solenoids 120 and 121, and by a single "DOWN" solenoid 122. A Gate Release solenoid 123 is provided for opening a gate or obstruction at the end of the loading conveyor. This gate is used only when two or more freezers are operated in tandem.

While the control circuit is primarily intended to furnish automatic action, it is possible to run through a complete filling operation by operating manual controls. These hand-operated switches are shown in the drawings mounted adjacent to the solenoids they control and their function is obvious.

As mentioned above, the freezers and their control circuits are adapted to operate in tandem, that is, after one freezer has been filled, the gate release is operated and the food packages are then sent to a second freezer for a similar filling and emptying cycle. The operation of a single freezer will be described since it is the same as the operation of a multiple arrangement except at the finish of each cycle when a transfer pulse is generated.

OPERATION OF SINGLE FREEZER

Preliminary settings are: the conveyors must be at the bottom of the machine. If it is not, turn control switch 124 to "Hand" position and close "Down" switch 125. This activates the "Down" solenoid and the conveyors move down at once. This is the load position for the first freezer plate and at this position limit switch (E) 113 is actuated. The No. 2 Selector switch 126 (FIG. 10) is left at "Single" and the push bar mechanism is set at the "Intermediate" position thereby operating switch bar 103.

With the switch 124 (FIG. 7) at the "Auto" position a start button 127 is manually operated, actuating a relay (R1) 128, lighting signal lamp 130, and closing four contacts 131 (FIG. 7), 132, 133 (FIG. 9), and 134 (FIG. 8). At the same time relay 135 (R6) is actuated by a circuit which can be traced from conductor 136 (connected to supply terminal 114), through relay winding 135, through contacts 134 (closed because R1 is actuated), over conductor 138, through the Intermediate switch 103 which is closed at this time, then through contacts 140, over conductor 141, through start contacts 127 to conductor 142, and back to supply terminal 114 by way of closed contacts 131 and switch 124. Relay 135 is held in its actuated condition by closed contacts 143 in series with the Intermediate switch 103.

When the contact 144 closes (on relay 135) power is applied through Limit Switch 112, closed at this time, to start timing motors 145 and 146 (FIG. 9). This circuit can be traced from conductor 142, through contacts 144 and 147, through switch 112, over conductor 148, through contacts 150, both timer motors, to conductor 136. Timer motor delays action for about .5 second and then operates switch 151. Timer motor 146 delays action for about 2 seconds and then operates switch 152 (FIG. 10). Also, when contacts 144 close, current is applied through switch 112, timer contacts 151, and contacts 132 to the "Catch Out" solenoid 117, and all the freezer plate catches are pulled out of engagement.

At this time power is also applied through Limit Switch 113, by way of contacts 144 to "R9" relay winding 153 and conductor 136, thereby opening normally closed contacts 131 (FIG. 7) and opening the holding winding of "R1" relay 128. For this reason, the "Start" switch 124 must be held in its operated position until the delay timer 145 operates, changing switch 151 and thereby sending current to the "Plate Change Relay" 154. This relay is actuated and operates five contacts, four normally open and one normally closed. One of these contacts 155 is a holding pair to retain the relay in its actuated condition. At this time contacts 147 are open but power is still applied through Selector switch No. 2, 126 to switch arm 112.

When relay R7, 154 is energized, contacts 156 (1–R7, FIG. 7) and 157 are both closed, thereby energizing both "UP" solenoids 120 and 121 are both operated to cause the yoke 106 to rise. At the same time contacts 158 are closed but nothing happens to this circuit because contacts 160 (4–R3, FIG. 8) are open. Also, contacts 161 (4–R7, FIG. 9) are opened, cutting of current from the "DOWN" solenoid 122 and thereby eliminating this movement of the yoke.

When the yoke has risen far enough to release Limit Switch 113 (FIG. 12), the Start Switch 127 can be returned to normal because relay 153 is normalized and contact 162 (1–R9, FIG. 9) is closed providing a holding circuit for relay 128 (R1, FIG. 7). While the yoke is set for rising, it does not go far because timer motor 146 (T2, FIG. 9) completes its delay run and switch 152 is again closed energizing relay 163 (R2) which is locked up due to the closing of contacts 131 (1R1) and Limit Switch 107.

Next, contacts 164 (2–R2, FIG. 7) and contacts 165 (3–R2) both close insuring power for the "UP" valves and the catches are moved in to engage the next plate. Also, contacts 165 (4–R2, FIG. 9) are closed (energizing the Stroke Count Reset Coil 167 and resetting the counter to its zero position. This counter and the Plate counter may be any type of counting mechanism which is set to a predetermined number and then gives a signal when the count has been reached. The counter 89 shown in Patent No. 2,812,050 is well suited to this purpose.

The yoke 106 continues to rise, first releasing switch 112 (FIG. 9) and then operating switches 107, 108, and 110 (FIG. 7). As soon as Limit Switch 107 is operated, current is removed from relay 163 and contacts 168 are opened, breaking the holding circuit.

With Limit Switches both operated, relay 170 (FIG. 7) is actuated by a circuit which can be traced from conductor 142, through both Limit Switches 107 and 108, over conductor 171, through relay winding 170, to conductor 136. When relay 170 is actuated, contacts 173 close a circuit to the "Catch In" solenoid 117 and retain the plate catches in their operated condition. Contacts 158 set up a circuit for the operation of the package push bar which moves the packages from the conveyor belt onto the plate.

The operation of the push bar mechanism and its controls has been described and claimed in U.S. Patent No. 2,812,050, and a detailed description is not necessary here. The circuit includes all of the switches 101, 102, 103, and 104, operated by a cam 105 on push bar 100. The circuit through contacts 158 is not complete until a sensing motor 174 operates a sensing switch 175, insuring that the conveyor belt is full of packages. Motor 174, as described in the above mentioned patent, runs continuously during a plate loading operation and turns a sensing wheel 176 in contact with the food packages on the conveyor belt. When the belt is full, wheel 176 stops, and clutch 177 slips, exerting a torque on the motor housing which is rocked and closes switch 175. The push bar operation starts, each row of packages being recorded by a stroke counter operated by a stroke count coil 178.

When the plate is full of packages, the stroke counter mechanism closes a pair of contacts 180 (FIG. 8), and, with the push bar at its "Intermediate" position, relay 135 is actuated, opening contacts 181, and cutting off current from solenoid 116 thereby de-energizing the reverse valve and stopping the push bar action. Also, contacts 243 (FIG. 8) are closed, thereby providing a holding circuit for relay 135. Contacts 144 are also closed to energize the "DOWN" solenoid 122 and the yoke starts down. At the same time, contacts 182 (FIGS. 7) are opened to cut off current from the holding circuit of relay winding 163 and normalize all its contacts.

As the yoke moves down, Limit Switches 107, 108, and 110 are normalized, cutting off current from relay 170 and normalizing its contacts. When this happens, contacts 173 are opened and the "Catch In" solenoid 117 is de-energized, releasing all the plate catches. Also, contacts 158 are opened de-energizing the package sensing circuit.

The conveyors on each side of the plate freezers are now moved to the next freezer plate and the second loading operation is begun. The control of this operation is described in detail in U.S. Patent No. 2,882,697. When the conveyors are in their new position, the same plate loading sequence is resumed as described above. Again, when the stroke counter finishes its count, contacts 180 again close and the conveyors move up to another plate.

After the last plate has been filled, the pusher bar once more stops on the "Intermediate" Limit Switch thereby energizing relay 135 (FIG. 8) as before. At this time, however, the plate counter is at its last set position and the yoke is at the top position, operating Limit Switch 11 and energizing relay 183 (FIG. 9), thereby opening contacts 184 (top of FIG. 7) and closing contacts 185. This action cuts off the current to the plate count coil 186 and sends current through the plate count reset coil 187 to reset the counter for a new sequence of operations. It has been found desirable to operate the counter on direct current and for this reason a plate count rectifier 188 is employed and the usual capacitor-resistor circuits are bridged across contacts 184 and 185 to absorb the arcs when the contacts are opened. Any type of counter mechanism can be used provided it possesses a series of contacts and a sequentially movable contact arm to traverse the contacts and apply current to a predetermined final contact when the count has been terminated.

When relay 135 was energized, it closed contacts 144 (FIG. 9) and sent a current through contacts 161 and 133 to the "DOWN" solenoid 122. This moves the conveyors and yoke to their lower positions. At this time Limit Switch 113 (FIG. 9) is operated, cutting off current to relay 190 by way of contacts 191 and the closed contacts 192 of the manual Reset Plate Counter switch. When relay 190 is de-energized contacts 193 are opened cutting off current from the "Catch Out" solenoid 117, contacts 150 are closed and contacts 194 (FIG. 7) are also closed, restoring these circuits to their original state.

At this time, all the plates have been filled with food packages and the conveyors returned to their lowest position. The fluid refrigerant is now circulated through the plates and the food frozen. At the end of the freezing cycle, the same loading-unloading sequence is performed.

It will be noted that several contacts and one or two relays have not been described in detail. This is because their function has already been described in one or more of the issued patents listed above. Also, there are a number of indicator lamps bridged across solenoids and relays which have not been mentioned. The lamps do not add anything to the operation of the circuit. They are only indicators and are useful only during servicing and repair.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

What is claimed:

1. An automatic freezing apparatus comprising, in combination, a stack of superimposed contact freezer plates with minimum spacing means there between to provide freezing cavities, means for supporting the lowermost plate of the stack in fixed relation, means for successively raising each plate above the lowermost plate to increase the depth of the cavity to allow charging of boxes of unfrozen foods into the cavity, said raising of each plate causing the raising of all plates located above said plate, said means comprising catch arms which underlie the upper plate in each pair forming a cavity, frames pivotally supporting said catch arms on two opposed sides of the stack, front and rear conveyors for delivering said boxes to each cavity to permit loading of the cavities at a plurality of levels, and automatic means for moving the frames vertically in stepped increments to position the catch arms at the respective cavities.

2. The structure recited in claim 1 wherein the apparatus is enclosed within an insulated housing having charging and discharging openings on two opposed walls thereof.

3. An automatic freezing apparatus comprising, in combination, a stack of superimposed contact freezer plates with minimum spacing means therebetween to provide freezing cavities, means for successively raising each plate above the lowermost plate to increase the depth of one cavity to allow charging of boxes of unfrozen foods into said cavity, said means comprising catch arms which underlie the upper plate in each pair forming a cavity, a frame pivotally supporting said catch arms on two opposed sides of the stack, front and rear conveyors for delivering said boxes to each cavity to permit loading of the cavities at a plurality of levels, and means for raising and lowering the frames in stepped increments to position the catch arms at the level of the respective cavities.

4. An automatic freezer comprising, in combination, an insulated housing having horizontal and vertical walls, a stack of superimposed contact freezer plates with minimum spacing means between each pair of adjacent plates in the stack to provide a plurality of freezing cavities and with the lowermost plate supported on one of said walls, and automatic means for successively feeding packages of unfrozen food to the cavities at a separate level for each cavity, and for increasing the plate spacing during feeding of each cavity, said means comprising vertically movable frames on two opposed sides of the stack, frame extensions leading forwardly and rearwardly of the stack, feeding and discharge conveyors supported by said extensions, inwardly movable catch arms also supported by said frames to underlie the upper plate in each pair forming a cavity, and hydraulic means for moving the frames in stepped increments.

5. An automatic freezer comprising, in combination, an insulated housing having horizontal and vertical walls, a stack of superimposed contact freezer plates with means for providing minimum spacing therebetween to provide a plurality of freezing cavities and with the lowermost plate supported on one of said walls, and means for successively feeding packages of unfrozen food to the cavities at a separate level for each cavity, and for increasing the plate spacing during feeding of each cavity, said means comprising a vertically movable frame on two opposed sides of the stack, walls along two remaining scales of the stack having feeding and discharge openings and conveyors for the packages and inwardly movable catch arms also supported by said frames to underlie the upper plate in each pair forming a cavity and automatic means for moving the catch arms to an adjoining cavity after one cavity has been filled with packages of food.

References Cited by the Examiner

UNITED STATES PATENTS

| | | | |
|---|---|---|---|
| 1,903,102 | 3/1933 | Farley | 34—144 X |
| 2,484,944 | 10/1949 | Hall | 62—341 |
| 2,485,509 | 10/1949 | Raye | 62—341 |
| 2,896,427 | 7/1959 | Lauterbach et al. | 62—341 |

ROBERT A. O'LEARY, *Primary Examiner.*

W. E. WAYNER, *Assistant Examiner.*